United States Patent
Shimizu et al.

(10) Patent No.: US 6,250,418 B1
(45) Date of Patent: Jun. 26, 2001

(54) POWER STEERING APPARATUS

(75) Inventors: Yoshinobu Shimizu, Sakai; Hirofumi Matsuoka, Kyoto, both of (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/310,140

(22) Filed: May 12, 1999

(30) Foreign Application Priority Data

May 22, 1998 (JP) .................................. 10-141827

(51) Int. Cl.[7] .................................. B62D 5/06
(52) U.S. Cl. .................. 180/422; 180/446; 701/41
(58) Field of Search .................. 180/422, 443, 180/444, 446; 701/41, 42

(56) References Cited

U.S. PATENT DOCUMENTS

| | | | | |
|---|---|---|---|---|
| 5,711,394 | * | 1/1998 | Fujii et al. | 180/422 |
| 5,816,360 | * | 10/1998 | Spillner | 180/422 |
| 5,829,547 | * | 11/1998 | Fujii et al. | 180/422 |
| 5,904,222 | * | 5/1999 | Liubakka et al. | 180/422 |
| 5,936,379 | * | 8/1999 | Matsuoka | 180/422 |
| 5,954,152 | * | 9/1999 | Kada et al. | 180/422 |
| 5,995,890 | * | 11/1999 | Permuy | 180/422 |
| 6,052,647 | * | 4/2000 | Parkinson et al. | 701/41 |
| 6,073,721 | * | 6/2000 | Grabowski | 180/422 |

* cited by examiner

*Primary Examiner*—Daniel G. DePumpo
(74) *Attorney, Agent, or Firm*—Rabin & Champagne, PC

(57) ABSTRACT

A power steering apparatus is provided, which is adapted to generate a steering assist force by a hydraulic pressure of a pump driven by an electric motor. The apparatus includes: a pulse width modulation control circuit for controlling the electric motor through a pulse width modulation control; a load detection circuit for detecting a load applied on the electric motor; and a control circuit for progressively increasing the PWM duty of the pulse width modulation control circuit up to 100% if the load on the electric motor is not lower than a predetermined level.

20 Claims, 3 Drawing Sheets

POWER STEERING APPARATUS

BACKGROUND OF THE INVENTION

1. Field of the Invention

The present invention relates to a power steering apparatus which applies a steering assist force to a steering mechanism by a hydraulic pressure generated by a pump driven by an electric motor.

2. Description of Related Art

Power steering apparatuses are conventionally utilized which assist operation of a steering wheel by supplying a working oil from an oil pump to a power cylinder coupled to a steering mechanism. The oil pump is driven by an electric motor such as a brushless motor, and a steering assist force is generated by the power cylinder in accordance with the rotation speed of the electric motor.

The electric motor is supplied with a driving current via a driving circuit, which is operative on the basis of a driving pulse signal applied from a controller such as an electronic control unit (ECU). The controller generates a driving pulse signal of a high duty ratio when a load on the motor is high, and generates a driving pulse signal of a low duty ratio when the load is small. Thus, a pulse width modulation (PWM) control is conducted to drive the electric motor at a constant rotation speed irrespective of the magnitude of the load. In this case, the detection of the magnitude of the load is achieved, for example, by detecting a motor current.

When a target rotation speed of the motor is low and the load is high, the PWM control is conducted under a high electric current condition. However, if this state continues for a long time, electronic components in the controller suffer from a remarkable temperature rise thereby being damaged. This is because the PWM control under the high electric current condition maximizes the switching loss of a switching device, a steady-state loss, and a loss due to a flywheel current.

In order to eliminate the switching loss and the loss due to the flywheel current under the high current condition, it is a conventional practice to set the PWM duty to 100% and discontinue the pulse width modulation control when the load on the electric motor exceeds a predetermined level. This approach is advantageous in that the electronic components in the controller can be protected and less expensive electronic parts can be employed as the components of the controller.

However, if the load gradually increases to exceed a certain level, the PWM duty is abruptly increased to 100%, whereby the steering assist force to be applied to the steering mechanism is suddenly increased. This gives a driver such an impression that the steering is suddenly lightened, resulting in an unsatisfactory steering feeling.

SUMMARY OF THE INVENTION

It is an object of the present invention to provide a power steering apparatus which ensures an improved steering feeling particularly when a load is high.

In accordance with one feature of the present invention, there is provided a power steering apparatus, which is adapted to generate a steering assist force by a hydraulic pressure of a pump driven by an electric motor (27), and comprises: a pulse width modulation control circuit (30, 31) for controlling the electric motor through a pulse width modulation control; a load detection circuit (14) for detecting a load applied on the electric motor; and a control circuit (30) for progressively increasing the PWM duty of the pulse width modulation control circuit up to 100% if the load on the electric motor detected by the load detection circuit is not lower than a predetermined level (TH).

It is noted that reference characters in parentheses hereinbefore and hereinafter represent the corresponding components to be described in the following embodiment.

With this arrangement, if the load on the electric motor is not lower than the predetermined level, the PWM duty is not abruptly but progressively increased up to 100%. Therefore, the steering assist force is not abruptly but progressively increased. Thus, a satisfactory steering feeling can be ensured.

In addition, the pulse width modulation control is discontinued with a PWM duty set to 100% when the load is high. Therefore, electronic components constituting the control circuit and the like will not suffer from a remarkable temperature rise.

In accordance with another feature of the present invention, there is provided a power steering apparatus which comprises: a pulse width modulation control circuit (30, 31) for controlling the electric motor through a pulse width modulation control; a mountain road traveling detection circuit (40, 41) for judging whether or not a vehicle is in mountain road traveling; and a control circuit (30, S1, S3) for progressively increasing the PWM duty of the pulse width modulation control circuit up to 100% if the mountain road traveling detection circuit judges that the vehicle is in the mountain road traveling.

During the mountain road traveling, the load on the electric motor is kept high. For this reason, the PWM duty is set to 100% when the vehicle is in the mountain road traveling, in accordance with the present invention. Thus, the PWM duty is prevented from being continuously kept at a high level, whereby electronic components constituting the control circuit and the like are prevented from suffering from a remarkable temperature rise. Further, the PWM duty is not abruptly changed but progressively increased to 100%, so that a satisfactory steering feeling can be ensured.

The two features described above may be employed in combination. More specifically, the PWM duty of the pulse width modulation control circuit may progressively be increased up to 100% if at least one of the following conditions is satisfied: the load on the electric motor is not lower than the predetermined level; and the vehicle is in the mountain road traveling.

The foregoing and other objects, features and effects of the present invention will become more apparent from the following description of the preferred embodiments with reference to the attached drawings.

DESCRIPTION OF THE PREFERRED EMBODIMENTS

Figure 1:
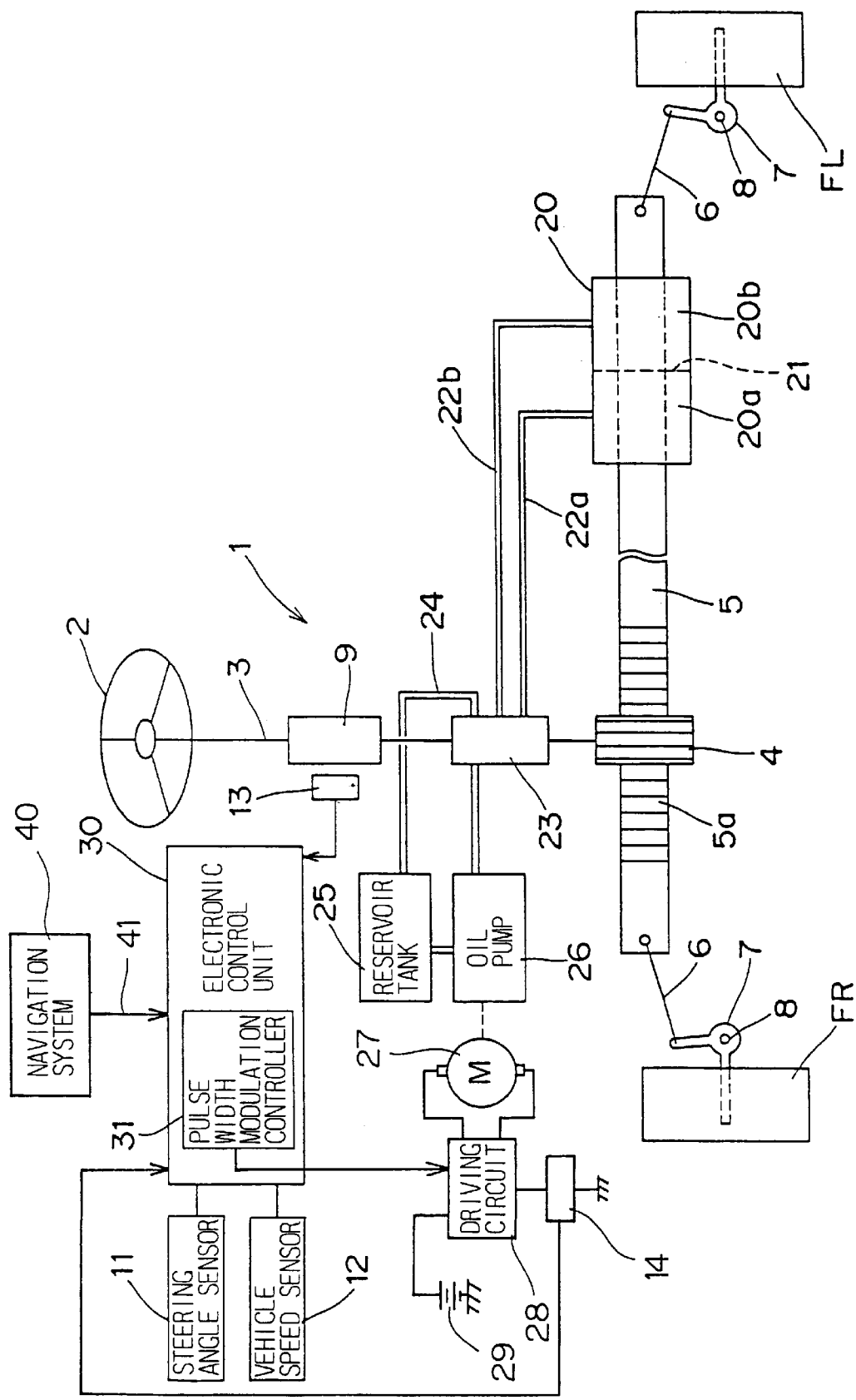
FIG. 1 is a conceptual diagram illustrating the basic construction of a power steering apparatus according to one embodiment of the present invention.

FIG. 1 is a conceptual diagram illustrating the basic construction of a power steering apparatus according to one embodiment of the present invention. This power steering apparatus is provided in association with a steering mechanism 1 of a motor vehicle for applying a steering assist force to the steering mechanism 1.

The steering mechanism 1 includes a steering wheel 2 to be operated by a driver, a steering shaft 3 coupled to the steering wheel 2, a pinion gear 4 provided at a distal end of the steering shaft 3, and a rack shaft 5 having a rack gear 5a meshed with the pinion gear 4 and extending transversely of the motor vehicle. Tie rods 6 are connected to opposite ends of the rack shaft 5, and further connected to knuckle arms 7 which respectively support left and right front wheels FL and FR as steerable wheels. The knuckle arms 7 are respectively provided rotatably about king pins 8.

With this arrangement, when the steering wheel 2 is operated to rotate the steering shaft 3, the rotational motion is converted into a linear motion transverse to the motor vehicle by the pinion gear 4 and the rack shaft 5. The linear motion is converted into rotational motions of the knuckle arms 7 about the king pins 8, thereby achieving the steering of the left and right front wheels FL, FR A torsion bar 9 which is adapted to be twisted in accordance with the direction and magnitude of a steering torque applied to the steering wheel 2 and a hydraulic pressure control valve 23 which is adapted to change its valve aperture in accordance with the direction and magnitude of the torsion of the torsion bar 9 are incorporated in the steering shaft 3. The hydraulic pressure control valve 23 is connected to a power cylinder 20 for applying a steering assist force to the steering mechanism 1. The power cylinder 20 includes a piston 21 provided integrally with the rack shaft 5, and a pair of cylinder chambers 20a and 20b split by the piston 21. The cylinder chambers 20a and 20b are connected to the hydraulic pressure control valve 23 via oil supply/return lines 22a and 22b, respectively.

The hydraulic pressure control valve 23 is disposed in an oil circulation line 24 which extends through a reservoir tank 25 and an oil pump 26. The oil pump 26 is driven by an electric motor 27, so that a working oil contained in the reservoir tank 25 is pumped up and supplied to the hydraulic pressure control valve 23. An excess of the working oil is returned to the reservoir tank 25 from the hydraulic pressure control valve 23 via the oil circulation line 24. When a torsion is exerted on the torsion bar 9 in one'direction, the hydraulic pressure control valve 23 supplies the working oil to one of the cylinder chambers 20a, 20b of the power cylinder 20 via one of the oil supply/return lines 22a, 22b. When a torsion is exerted on the torsion bar 9 in the other direction, the hydraulic pressure control valve supplies the working oil to the other of the cylinder chambers 20a, 20b via the other of the oil supply/return lines 22a, 22b. When virtually no torsion is exerted on the torsion bar 9, the hydraulic pressure control valve 23 is in a so-called equilibrium state, so that the working oil is not supplied to the power cylinder 20 but circulated in the oil circulation line 24.

When the working oil is supplied to either one of the cylinder chambers of the power cylinder 20, the piston 21 moves transversely of the-motor vehicle. Thus, a steering assist force acts on the rack shaft 5.

The magnitude of the steering assist force is adjusted by controlling a voltage to be applied to the electric motor 27 which drives the oil pump 26. The motor 27 is controlled by an electronic control unit 30. The electronic control unit 30 determines the voltage to be applied to the motor 27 on the basis of an output signal of a steering angle sensor 11 for detecting the steering angle of the steering wheel 2, an output signal of a vehicle speed sensor 12 for detecting the speed of the vehicle, an output signal of a torque sensor 13 for detecting the direction and magnitude of a torque applied to the torsion bar 9 and an output signal of a motor current detection circuit 14. Thus, the steering assist force is applied to the steering mechanism 1 in accordance with the steering angle, the steering torque, the vehicle speed and a load on the motor 27.

More specifically, the motor 27 is supplied with an electric current from a battery 29 via a driving circuit 28. The driving circuit 28 is connected to the motor current detection circuit 14 which detects an electric current (motor current) flowing through the motor 27. The higher the load, the greater the electric current flowing through the motor 27. Therefore, the magnitude of the load on the motor 27 can be determined on the basis of the output signal of the motor current detection circuit 14.

The electronic control unit 30 includes a CPU, a RAM which provides a work area for the CPU, and a ROM storing therein operation programs for the CPU. The electronic control unit 30 further includes a pulse width modulation controller 31 for applying a driving pulse signal to the driving circuit 28. The pulse width modulation controller 31 supplies a PWM duty driving pulse signal to the driving circuit 28 in accordance with the steering angle, the steering torque, the vehicle speed and the motor current.

The electronic control unit 30 further receives a mountain road traveling signal inputted thereto via a line 41 from a navigation system 40 mounted on the vehicle. The navigation system 40 includes a display device such as of a liquid crystal display panel, a display controller for displaying a map and a present position of the vehicle on the display device, and a position detecting device for detecting the present position of the vehicle. The navigation system 40 is adapted to output a mountain road traveling signal When the vehicle is in mountain road traveling.

In this case, map data to be used in the navigation system 40 may include attribution data which is added to each cellular road section to indicate whether or not the cellular road section corresponds to a mountain road. The map data are provided in the form of a recording medium such as a CD-ROM.

The position detecting device may utilize, for example, a global positioning system (GPS), or may be an autonomous device which is adapted to detect the present position of the vehicle on the basis of output signals of a traveling distance sensor and an azimuth sensor through a so-called map matching technique without acquiring external information. In brief, any position detection principle may be employed as long as it is possible determine whether or not the vehicle is in mountain road traveling.

Figure 2:
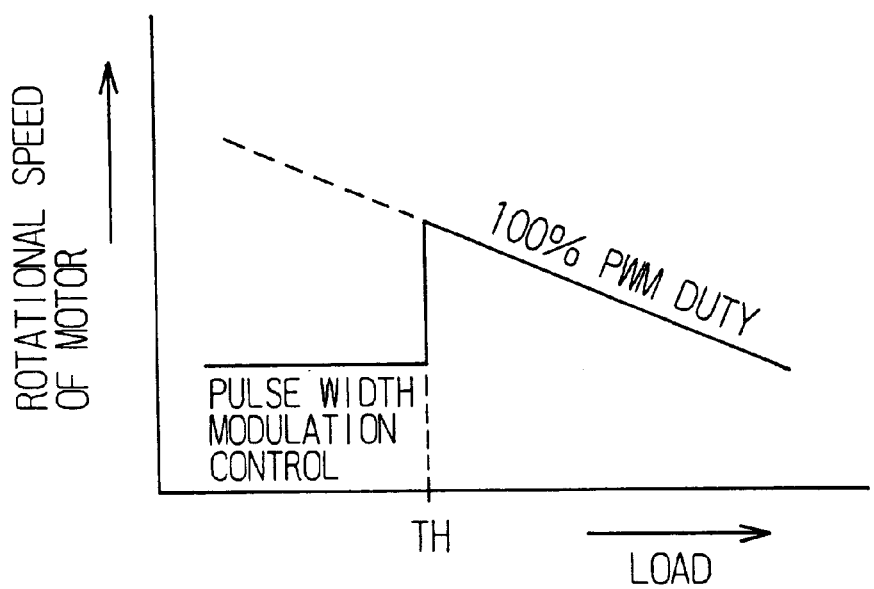
FIG. 2 is a graph showing a relationship between the rotation speed of an electric motor and a load.

FIG. 2 is a graph showing a relationship between the rotation speed of the electric motor 27 and the load. The electronic control unit 30 performs a control operation as shown in FIG. 2 on the basis of the motor current (i.e., load) detected by the motor current detection circuit 14. More specifically, if the load is lower than a predetermined threshold TH, the rotation speed of the motor 27 is kept constant through a pulse width modulation control by the pulse width modulation controller 31. If the load is not lower than the predetermined threshold TH, the PWM duty of the pulse width modulation controller 31 is set to 100%, and the pulse width modulation control of the motor 27 is not performed. Thus, the electronic components in the electronic control unit 30 can be protected.

Figure 3:
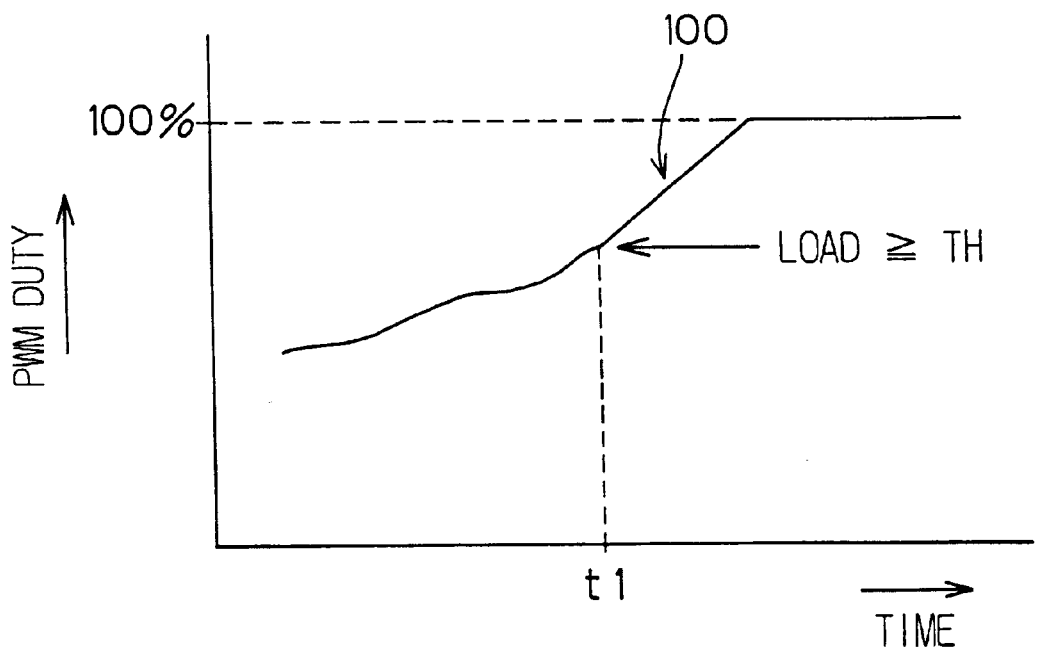
FIG. 3 is a graph showing a change in PWM duty over time when the load is high.

FIG. 3 is a graph showing a change in the PWM duty over time when the load is high. When the load on the motor 27 reaches the threshold TH at a time point t1, the electronic control unit 30 progressively increases the PWM duty up to 100% as indicated by a reference numeral 100. That is, the PWM duty is not abruptly increased to 100% but progressively increased at a predetermined rate.

The steering assist force applied to the steering mechanism 1 is not abruptly increased even if the load is high. Hence, there is no possibility to give a driver such an impression that the steering is suddenly lightened. Thus, the steering feeling can be improved. After the load has reached the threshold TH, the PWM duty is preferably increased at a rate of about 10% per second, for example. The PWM duty is not necessarily increased continuously, but may be increased stepwise by a predetermined value (e.g., 0.1%) on a predetermined pulse width modulation control cycle (e.g., 10 milliseconds).

Figure 4:
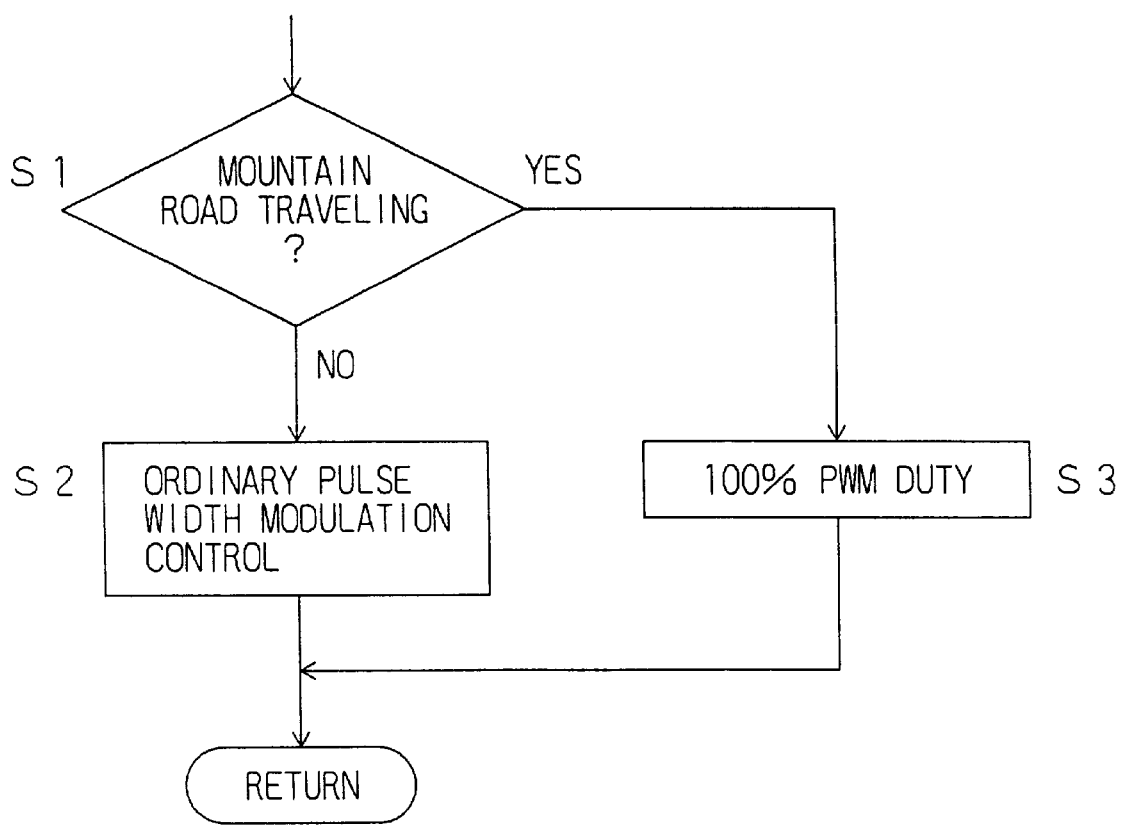
FIG. 4 is a flow chart for explaining a control operation to be performed by an electronic control unit on the basis of a mountain road traveling signal applied from a navigation system.

FIG. 4 is a flow chart for explaining a control operation to be performed by the electronic control unit 30 on the basis of a mountain road traveling signal applied via the line 41 from the navigation system 40. The electronic control unit 30 judges whether or not the mountain traveling signal is applied thereto to determine whether or not the vehicle is in the mountain road traveling (Step S1). If the vehicle is not in the mountain road traveling, an ordinary pulse width modulation control operation is performed (Step S2). If the vehicle is in the mountain road traveling, the PWM duty is set to 100% (Step S3). The PWM is not abruptly but progressively increased up to 100% as in the case where the load on the motor 27 exceeds the threshold TH.

After Steps S2 and S3, the program returns to Step S1.

When the vehicle is in the mountain road traveling, the motor 27 is kept in a high load state. In this state, the PWM duty is kept high. If the load on the motor 27 is kept slightly lower than the threshold TH, for example, the PWM duty is kept relatively high. This may result in a remarkable temperature rise of the electronic components of the electronic control unit 30.

In this embodiment, however, the temperature rise of the electronic components is prevented by discontinuing the pulse width modulation control with the PWM duty set at 100%. This eases the thermal damage preventive design (heat design) of the electronic control unit 30. Therefore, less expensive parts can be employed as the components of the electronic control unit 30, leading to cost reduction.

While the embodiment of the present invention has thus been described, the invention can be embodied in any other forms. Although information indicative of whether or not the vehicle is in the mountain road traveling is taken into the electronic control unit 30 from the navigation system 40 for the control of the power steering apparatus in the embodiment described above, any other information generated by the navigation system 40 may be utilized. For example, information indicative of whether or not the vehicle may be in straight road traveling is inputted into the electronic control unit 30 from the navigation system 40, and used for steering midpoint detection process of the steering sensor 11. The steering midpoint detection process is to determine steering angle data outputted from the steering sensor 11 when the vehicle is in the straight road traveling. Upon determination of the steering sensor output data corresponding to a steering midpoint, it is possible to determine an absolute steering angle. Thus, energy saving can be enhanced by stopping the electric motor 27 if the steering angle is kept at a level close to the midpoint for a predetermined period and actuating the electric motor 27 in response to the steering angle exceeding a predetermined level.

While the present invention has been described in detail by way of the embodiment thereof, it should be understood that the foregoing disclosure is merely illustrative of the technical principles of the present invention but not limitative of the same. The spirit and scope of the present invention are to be limited only by the appended claims.

What is claimed is:

1. A power steering apparatus, comprising:
    an electric motor;
    a pump to be driven by the electric motor for generating a hydraulic pressure for steering assist;
    a pulse width modulation control circuit for controlling the electric motor through a pulse width modulation control;
    a load detection circuit for detecting a load applied on the electric motor; and
    a control circuit for progressively and gradually increasing a PWM duty of the pulse width modulation control circuit to a PWM duty of 100% if the load on the electric motor detected by the load detection circuit is not lower than a predetermined level.

2. A power steering apparatus as set forth in claim 1, wherein the control circuit progressively increases the PWM duty at a predetermined rate to the PWM duty of 100%.

3. A power steering apparatus as set forth in claim 1, wherein the load detection circuit includes a motor current detection circuit for detecting an electric current flowing through the electric motor.

4. A power steering apparatus as set forth in claim 1, further comprising:
    a mountain road traveling detection circuit for judging whether or not a vehicle is in mountain road traveling;
    wherein the control circuit progressively increases the PWM duty of the pulse width modulation control circuit to the PWM duty of 100% irrespective of a magnitude of the load detected by the load detection circuit if the mountain road traveling detection circuit judges that the vehicle is in the mountain road traveling.

5. A power steering apparatus as set forth in claim 4, wherein the mountain road traveling detection circuit includes a position detection device for detecting a present position of the vehicle.

6. A power steering apparatus as set forth in claim 5, wherein the mountain road traveling detection circuit includes a circuit for referring to map data which includes attribution data added to each cellular road section to indicate whether or not the cellular road section corresponds to a mountain road, and a circuit for outputting a mountain road traveling signal if attribution data of a cellular road section corresponding to the present position of the vehicle detected by the position detection device indicates that this particular cellular road section corresponds to a mountain road.

7. A power steering apparatus as set forth in claim 1, wherein the PWM duty is increased at a predetermined and continuous rate.

8. A power steering apparatus as set forth in claim 7, wherein the PWM duty is increased at a rate of about 10% per second.

9. A power steering apparatus as set forth in claim 1, wherein the PWM duty is increased stepwise by a predetermined value, on a predetermined pulse width modulation cycle.

10. A power steering apparatus as set forth in claim 9, wherein the predetermined value is about 0.1%.

11. A power steering apparatus as set forth in claim 10, wherein the predetermined pulse width modulation cycle is about 10 milliseconds.

12. A power steering apparatus, comprising:

an electric motor;

a pump to be driven by the electric motor for generating a hydraulic pressure for steering assist;

a pulse width modulation control circuit for controlling the electric motor through a pulse width modulation control;

a mountain road traveling detection circuit for judging whether or not a vehicle is in mountain road traveling;

a control circuit for progressively and gradually increasing a PWM duty of the pulse width modulation control circuit to a PWM duty of 100% if the mountain road traveling detection circuit judges that the vehicle is in the mountain road traveling.

13. A power steering apparatus as set forth in claim 12, wherein the control circuit progressively increases the PWM duty at a predetermined rate to the PWM duty of 100%.

14. A power steering apparatus as set forth in claim 13, wherein the mountain road traveling detection circuit includes a position detection device for detecting a present position of the vehicle.

15. A power steering apparatus as set forth in claim 14, wherein the mountain road traveling detection circuit includes a circuit for referring to map data which includes attribution data added to each cellular road section to indicate whether or not the cellular road section corresponds to a mountain road, and a circuit for outputting a mountain road traveling signal if attribution data of a cellular road section corresponding to the present position of the vehicle detected by the position detection device indicates that this particular cellular road section corresponds to a mountain road.

16. A power steering apparatus as set forth in claim 7, wherein the PWM duty is increased at a predetermined and continuous rate.

17. A power steering apparatus as set forth in claim 16, wherein the PWM duty is increased at a rate of about 10% per second.

18. A power steering apparatus as set forth in claim 12, wherein the PWM duty is increased stepwise by a predetermined value, on a predetermined pulse width modulation cycle.

19. A power steering apparatus as set forth in claim 18, wherein the predetermined value is about 0.1%.

20. A power steering apparatus as set forth in claim 19, wherein the predetermined pulse width modulation cycle is about 10 milliseconds.

* * * * *